US012402680B2

(12) United States Patent
Schneider et al.

(10) Patent No.: US 12,402,680 B2
(45) Date of Patent: Sep. 2, 2025

(54) FASTENING DEVICE AND WEARABLE ARTICLE WITH A FASTENING DEVICE

(71) Applicant: ON CLOUDS GMBH, Zürich (CH)

(72) Inventors: Damian Schneider, Zürich (CH); Alexandra Beeken, Zürich (CH); Zachary Runzo, Zürich (CH)

(73) Assignee: ON CLOUDS GMBH, Zürich (CH)

( * ) Notice: Subject to any disclaimer, the term of this patent is extended or adjusted under 35 U.S.C. 154(b) by 32 days.

(21) Appl. No.: 18/222,069

(22) Filed: Jul. 14, 2023

(65) Prior Publication Data

US 2024/0023656 A1 Jan. 25, 2024

(30) Foreign Application Priority Data

Jul. 20, 2022 (CH) .............................. 000864/2022

(51) Int. Cl.
| | | |
|---|---|---|
| *A41F 1/00* | (2006.01) | |
| *A41F 15/00* | (2006.01) | |
| *A45F 3/04* | (2006.01) | |

(52) U.S. Cl.
CPC .................................. *A41F 15/002* (2013.01)

(58) Field of Classification Search
CPC ... Y10T 24/31; Y10T 24/318; Y10T 24/1397; Y10T 24/1394; A41D 19/0041; A41D 2300/32; F16G 11/101; A45F 5/02; A45F 3/16; A45F 3/166; A45F 2003/148; A45C 13/1038; A41F 1/00
USPC ............................................ 2/96, 102, 128
See application file for complete search history.

(56) References Cited

U.S. PATENT DOCUMENTS

| | | | |
|---|---|---|---|
| 3,080,867 A | 3/1963 | Eichinger | |
| 4,328,605 A * | 5/1982 | Hutchison | F16G 11/101 24/136 R |
| 5,697,128 A * | 12/1997 | Peregrine | F16G 11/101 24/482 |
| 6,170,130 B1 * | 1/2001 | Hamilton | A45F 3/04 24/130 |
| 2005/0283952 A1 * | 12/2005 | Talbot | B25H 3/00 24/300 |
| 2006/0211336 A1 * | 9/2006 | Brigham | A61M 1/804 450/86 |
| 2014/0353346 A1 * | 12/2014 | Chapuis | A45F 3/04 224/148.2 |
| 2015/0189931 A1 * | 7/2015 | Elliott | A41D 19/0041 24/3.12 |

(Continued)

FOREIGN PATENT DOCUMENTS

| | | |
|---|---|---|
| JP | 6 056115 B2 | 1/2017 |
| WO | WO 2011/152399 A1 | 12/2011 |
| WO | WO 2013/073530 A1 | 5/2013 |

OTHER PUBLICATIONS

EPO, Munich, Germany, EPO Form 1703 01.91TRI, European Search Report for European Patent Application No. EP 23 18 4570, Nov. 3, 2023 (08 pages).

(Continued)

*Primary Examiner* — Jack W Lavinder
(74) *Attorney, Agent, or Firm* — Pauley Erickson & Swanson

(57) ABSTRACT

A fastening device (1) for a wearable article, the fastening device including four hook elements (2, 3, 4, 5) a central adjustment unit (6) and fastening cord (7). Furthermore, a wearable article with one or two fastening devices is disclosed.

8 Claims, 4 Drawing Sheets

(56) References Cited

U.S. PATENT DOCUMENTS

| | | |
|---|---|---|
| 2017/0200437 A1 | 7/2017 | Lee |
| 2022/0287388 A1* | 9/2022 | Thatcher .................. A41D 1/04 |
| 2024/0023654 A1 | 1/2024 | Schneider et al. |

OTHER PUBLICATIONS

EPO, Munich, DE, EPO Form 1507N 06.12, Communication with Form 1503 03.82, Ext. EP Search Report for European Patent Application No. EP 23 18 4571, Oct. 18, 2023 (7 pp).

* cited by examiner

FASTENING DEVICE AND WEARABLE ARTICLE WITH A FASTENING DEVICE

CROSS-REFERENCE TO RELATED APPLICATIONS

Swiss Patent Application No. 000864/2022, filed 20 Jul. 2022, the priority document corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention lies in the field of fastening wearable articles, such as vests, backpacks, bags and the like to a wearer and relates to a fastening device, the use of such a fastening device as well as a wearable article including a fastening device.

Discussion of Related Art

Many different fastening devices for wearable articles with two shoulder straps are known in the prior art. One of the most common fastening device is known from backpacks in the form of buckle straps which extend from one shoulder strap of the backpack to the other and which can be snap fitted into a corresponding socket establishing a releasable form locking connection and fastening the backpack to the wearer. Functional backpacks, such as travelling or hiking backpacks, typically comprise two parallel extending buckle straps, i.e., straps which run in the connected configuration in parallel to each other, one extending over the breast area of the wearer securing the should straps tightly to the wearer's body and the other running over the hip and stomach area of the wearer, thereby fastening the backpack tightly to the lower back and further distributing luggage weight onto the wearer's hips.

A common problem associated with the above mentioned devices is that they are typically either fixedly connected to the shoulder straps, i.e., their position with respect to the shoulder straps (their height) cannot be adjusted at all, or their positioning can be adjusted along a certain distance, however, the straps cannot be fixed in a certain position with respect to the shoulder straps, which entails continuous movement and unwanted displacement of the fastening devices when worn.

Furthermore, adjustment of many known fastening devices, in particular tightening the fastening devices is cumbersome during certain activities such as running.

A further disadvantage of certain known fastening devices is that they exert pulling forces on the shoulder straps in a non-uniform and/or unsymmetrical manner, which is uncomfortable for the wearer, may lead to undesired displacement of the wearable article and further to undesired weight distribution, thereby causing pain for the wearer.

SUMMARY OF THE INVENTION

It is therefore the general object of the present invention to advance the state of the art in the field of fastening devices for wearable articles, in particular wearable articles having two should straps forming a shoulder loop, and preferably to overcome one or more of the disadvantages of the prior art fully or partly. In advantageous embodiments, a fastening device and a wearable article is provided which allows a fast and reliable adjustment of the positioning of the fastening device with respect to the shoulder straps (i.e., the height of the fastening device) and/or of the tightness of the fastening device. In further advantageous embodiments, a fastening device and a wearable article is provided which allows exerting uniform and/or symmetrical pulling forces onto the shoulder straps.

The general object is achieved by the subject-matter of the independent claims. Further advantageous embodiments follow from the dependent claims and the overall disclosure.

In a first aspect, the invention relates to a fastening device for a wearable article, particularly a wearable article having two shoulder straps which may form a loop, i.e., a shoulder loop, for the arms and/or shoulders of a wearer, such as a backpack, a bag or a vest. The fastening device comprises four peripheral hook elements, a central adjustment unit and a fastening cord, in particular only a single fastening cord. Each of the four hook elements defines a cord holding receptacle which holds the fastening cord in such a way that the fastening cord can longitudinally be moved through the holding receptacle. The tem' "longitudinally moved" means that the position of the cord holding receptacle along the fastening cord can be adjusted or changed. For this, either the fastening cord can be moved with respect to the cord holding receptacle and/or the cord holding receptacle can be moved along the fastening cord. The fastening cord directly connects each of the four hook elements with the central adjustment unit. Thus, the four hook elements may be arranged around the central adjustment unit and are therefore peripheral hook elements. The central adjustment unit forms a releasable locking connection with the fastening cord, thereby essentially preventing longitudinally moving the fastening cord with respect to the central adjustment unit. Preferably, the central adjustment unit forms a fora-locking and/or force-locking and/or frictional-locking connection, particularly a clamping connection, with the fastening cord. Due to the peripheral arrangement of the four hook elements, it is possible to evenly, in particular uniformly and/or symmetrically, distribute the pulling or tightening forces over a corresponding wearable device. Furthermore, hook elements allow fast and easy mounting of the fastening device to a wearable article.

A releasable locking connection as used herein refers to a connection which is locked by itself, i.e., when not manipulated. Typically, a longitudinal movement of the fastening cord with respect to the central adjustment unit is therefore prevented. Furthermore, the term "releasable" means that the connection can be released without exertion of high forces and/or without destroying the connected parts. Therefore, cutting, sawing or tearing connected elements apart under exertion of high forces which destroys the structural integrity of the connected parts is not considered as releasing a locking connection and thus not as a releasable locking connection. Furthermore, a releasable locking connection can be released and rejoined multiple times without altering the structural integrity of the connected parts.

The cord holding receptacle may in some embodiments be a cord holding groove. A groove as used herein is typically defined by a groove wall, which surrounds and delimits the groove, however has an opening which allows to insert the fastening cord. Thus, in a cross-section perpendicular to the longitudinal extension of the groove, the groove wall has a gap which is the opening. In contrast, a channel as used herein has a channel wall which in cross-section perpendicular to the longitudinal extension of the channel completely circumferentially surrounds and delimits the channel.

Both a groove and a channel typically have along the longitudinal direction two opposing distal inlets. In some embodiments, a groove as used herein may comprise a constricted opening. A constricted opening is an opening whose gap, i.e., the distance between the groove walls is constricted with respect to the groove diameter.

The fastening cord may in some embodiments be elastic.

In some embodiments the fastening cord comprises two distal ends. The two distal ends may in some embodiments be protruding freely from the central adjustment unit, i.e., they are not attached or mounted to any other element, but preferably only to the central adjustment unit. Typically, the majority of the remaining part of the fastening cord extending between two distal ends of the fastening cord, in particular all remaining parts except the part protruding from the central adjustment unit, extends between the central adjustment unit and the four hook elements and optionally also between the hook elements themselves.

In some embodiments, the fastening device comprises only four hook elements. In other embodiments it may also be possible that the fastening device comprises more than four of the hook elements as described herein, preferably however an even number of such hook elements.

In some embodiments, the central adjustment unit is configured such that it is biased into a locking configuration in which it forms the releasable locking connection with the fastening cord. Such a biasing may for example be achieved by a biasing force. For example, a resilient element, such as a spring or an elastomer, may exert a biasing force such that the central adjustment unit is biased into the locking configuration. It is understood that in order to release the releasable locking configuration, this biasing force must be overcome by a counterforce. In particular the biasing force may be exerted onto one, two or more locking structures, thereby preferably clamping the fastening cord to the central adjustment unit in the locking configuration. Preferably, in the locking configuration, longitudinally moving the fastening cord with respect to, the central adjustment unit is prevented.

In certain embodiments, the central adjustment unit is configured such that it can be switched between the locking configuration and an open configuration. In the open configuration, longitudinally moving the fastening cord with respect to, in particular through, the central adjustment unit is enabled or possible. Preferably, the central adjustment unit is configured such that for switching from the locking configuration into the open configuration a biasing force biasing the central adjustment unit into the locking configuration must be overcome. The biasing force may for example be 0.5 N to 50 N, in particular 1 N to 25 N.

In some embodiments, the central adjustment unit comprises two separate locking channels through which the fastening cord extends. A locking channel is a channel which may for example be switched between a locking configuration, in which longitudinally moving the fastening cord with respect to the central adjustment unit and particularly through the locking channel is prevented, to an open configuration in which longitudinally moving the fastening cord with respect to the central adjustment unit, in particular through the locking channel is enabled or possible. Preferably, each locking channel is biased into the locking configuration and may particularly be brought into the open configuration. For example, the central adjustment unit may be configured such that in the locking configuration, the locking channel cross-section is narrower than in the open configuration. Particularly, in the locking configuration, the fastening cord may be clamped to the central adjustment unit.

In certain embodiments, the central adjustment unit may define a tubular housing portion defining a compartment and two pairs of through-going openings which open into the compartment. The two openings of such a pair are typically arranged coaxially to each other. Furthermore, one or more, in particular two, locking structure(s) may be arranged partly or fully inside the compartment. Each locking structure may define a through-going locking structure opening. Each locking structure is arranged such that in the locking configuration, the locking structure opening may be fully or partly offset to at least one pair of through-going openings defined by the tubular housing. In contrast, in the opening configuration, each locking structure may be arranged such that the through-going opening of the locking structure is coaxially arranged with the corresponding pair of through-going openings defined by the tubular housing.

In some embodiments, the central adjustment unit comprises a lug. The lug may define, respectively delimit, one or more guide channels, e.g., two guide channels. Furthermore, the fastening cord may run through at least one, in particular through all, of the guide channels. In certain embodiments, the fastening cord may run through the one or more, or all, guide channels such that it can longitudinally be moved through the guide channel(s). Thus, in contrast to the central adjustment unit, the guide channels do not form a locking configuration in which longitudinally moving the fastening cord with respect to the lug would be prevented, but such a movement is generally possible. The lug may for example be made of textile material. Such guide channels may enable for example an X-shape of the fastening cord in such a manner that the fastening cord is only at two positions of the fastening cord in a locking configuration and not in four or six, thereby simplifying the fastening system and avoiding malfunction. Such guide channels in particular simplify fastening of the fastening device as they generally allow longitudinally moving the fastening cord.

In certain embodiments, the fastening cord extends from one of the four hook elements directly to the lug of the central adjustment unit and through one, in particular the only one, guide channel and from there directly to another, in particular adjacent, hook element.

In certain embodiments, the lug defines at least two, in particular only two, separate guide channels, namely a first guide channel and a therefrom separated second guide channel. In such embodiments, the fastening cord may extend from one of the four hook elements directly to the lug of the central adjustment unit and through one of the two guide channels and from there directly to another, in particular adjacent, hook element. Furthermore, the fastening cord may extend from another of the four hook elements (i.e., one of the remaining two hook elements) directly to the lug of the central adjustment unit and from there, via the other one of the two guide channels, protrude freely from the lug. Additionally, the fastening cord may extend from another of the four hook elements one (i.e., the last remaining one of the four hook elements) directly to the lug of the central adjustment unit and from there also via this other one of the two guide channels protrude freely from the lug. Thus, in such embodiments, two sections of the fastening cord may join each other (without bonding together) within the other one of the two guide channels, i.e., the second guide channel. This second guide channel may preferably be T-shaped. Particularly a first section of the fastening cord will enter the second guide channel from one side and a second section of the fastening cord will enter the second guide channel from the other side and the will then join at the crossing point of the T-shaped guide channel and preferably be bent, e.g., around an angle of 20° to 90°, then exit the T-shaped guide channel together and protrude freely from the lug.

It is understood that the terms "first" and "second" as used herein are used to differentiate different elements. However, this does not mean that the presence of such a "second" element necessarily must require the presence of a "first" element.

In some embodiments, the two distal ends of the fastening cord protrude, particularly freely protrude, from the central adjustment unit. In embodiments whit a lug having one or more guide channels, the two distal ends may protrude from the lug, respectively the guide channel. In certain embodiments, it may be possible that the two distal ends of the fastening cord are connected together, for example by a form-locking connection, such as a knot, a force-locking connection, for example clamping or by a material bonded connection, such as gluing or fusing.

In some embodiments, each hook element comprises, in addition to the, and therefrom separated, cord holding receptacle, one or more, in particular two, hooks. Such hooks are each being configured for connecting the fastening device with an engagement loop of the wearable article. In particular, such hooks may be configured for engaging with an engagement loop of the wearable article. In contrast to fixed connections such as stitching or gluing, such hooks allow to rapidly and easily adjust the height of the fastening device particularly with respect to the shoulder straps of the wearable article. In contrast to other releasable connections, such as knotting, hooks can be rapidly engaged and disengaged with the engagement loops and thus enhance the user-friendliness.

In certain embodiments, each hook element is configured such that the one or more hooks are oppositely arranged of the cord holding receptacle.

In some embodiments, each hook defines a groove, which may be considered a hook groove. Particularly such a groove may have a round, e.g., circular or elliptic, cross-section. Preferably each hook defines a constricted groove opening. Typically, the constricted groove opening, respectively the gap between the groove walls is equal or smaller, in particular smaller, than the diameter of the fastening cord. As the hooks are generally at least to a certain extent flexible, their opening can be widened manually for inserting the fastening cord, but thereafter the fastening cord is secured within the groove.

In certain embodiments, each hook may essentially be S-shaped, respectively have the shape of a lower or upper half of an "S".

In some embodiments, each hook element comprises two hooks, particularly only two hooks, which are arranged one after another. Preferably, the two hooks are spaced apart from each other, particularly such that they define a gap between them. This makes the hooks themselves more flexible which simplifies introduction of the fastening cord.

In some embodiments, the two hooks of at least one of the hook elements, or of all of the hook elements, extend in parallel to each other or alternatively inversely to each other. Hooks which extend in parallel to each other can generally be considered as being congruent to each other such that they can be transformed into each other by linear translation. Inverse hooks can generally be considered as congruent to each other such that they can be transformed into each other by point inversion. For example, two hooks having an S shape, respectively the shape of a lower or upper half of an "S", and extending in parallel have the groove opening oriented into the same direction, while two hooks having an S shape, respectively the shape of a lower or upper half of an "S", and extending inversely to each other have the groove openings oriented in different, particularly in opposite, directions.

In some embodiments, the fastening cord extends from the central adjustment unit directly to each of the four hook elements, through the cord holding receptacle of each of the hook elements and directly from the cord holding receptacle of the corresponding hook element back to the central adjustment unit. Thus, two portions of the fastening cord extend directly between each hook element and the central adjustment element. At the central adjustment unit, the fastening cord may for example run through a guide channel or through a locking channel. Typically, in such embodiments, the fastening cord does not directly extend between, respectively connect, two hook elements. In particular, in certain embodiments, the fastening device may be X-shaped, wherein the central adjustment unit is arranged in the crossing point of the X-shape.

In some embodiments, the fastening cord extends from the central adjustment unit directly to each of the of the four hook elements, then through the fastening cord holding receptacle of each of these hook elements and from the fastening cord holding receptacle of the corresponding hook element directly to another, in particular adjacent, hook element. Thus, in contrast to the embodiment described in the paragraph above, each hook element is directly connected by the fastening cord with the central adjustment unit and with one other hook element. Particularly such embodiments consist of two pairs of hook elements, wherein each pair consists of two hook elements which are directly connected with each other by the fastening cord. However, the two pairs of hook elements are preferably not directly connected with each other by the fastening cord.

In a second aspect, the invention relates to a wearable article, which has two shoulder straps, in particular only two shoulder straps, namely a first shoulder strap and a therefrom separated second shoulder strap. The term "wearable" relates to an article which can be worn such that the article defines one or more receptacle structures such as a shoulder loop, for accommodating a body part of a wearer. The wearable article comprises the fastening device according to any of the embodiments as described herein, in particular with respect to the first aspect of the invention. Furthermore, the first shoulder strap comprises at least two or more first engagement loops and the second shoulder strap comprises at least two or more second engagement loops. The first and second engagement loops may be configured for being engaged with the hook elements of the fastening device. Thus, two hook elements may be each connected with one of the first engagement loops of the first shoulder strap and the other two hook elements may each be connected with one of the second engagement loops of the second shoulder strap. In some embodiments, the first engagement loops and the second engagement loops are aligned with each other, i.e., they have the same position, respectively height, with respect to the first and second shoulder strap.

The wearable article may in some embodiments be a backpack, a bag or a garment such as a vest, e.g., a running vest.

In some embodiments, the first shoulder strap comprises at least 3, particularly at least 4, particularly at least 6, particularly at least 8, first engagement loops and the second shoulder strap comprises at least 3, particularly at least 4, particularly at least 6, particularly at least 8, second engagement loops. In some embodiments, the first shoulder strap comprises 3 to 20, particularly 4 to 15, more particularly at least 6 to 15, more particularly at least 7 to 12, first engagement loops and the second shoulder strap comprises 3 to 20, particularly 4 to 15, more particularly at least 6 to 15, more particularly at least 7 to 12, second engagement loops.

In certain embodiments the number of first engagement loops and the number of second engagement loops is equal.

In some embodiments, the first engagement loops and the second engagement loops may each be formed from a single string which is only section-wise attached, for example by gluing, fusing or stitching, to the first shoulder strap, respectively the second shoulder strap, in such a manner that the non-attached portions form the first, respectively second engagement loops. In some embodiments, the first engagement loops and the second engagement loops may be daisy chain loops.

In some embodiments, the two hook elements of the fastening device, in particular two adjacent hook elements of the fastening device, are each engaged with one of the first engagement loops. It is understood that these two loops are engaged with different first engagement loops. Furthermore, two hook elements, i.e., the other two of the four hook elements, of the fastening device are each engaged with one of the second engagement loops. It is understood that these two loops are engaged with different second engagement loops. Preferably, the hook elements are engaged such with the first and second engagement loops that the central adjustment unit is arranged between the first shoulder strap and the second shoulder strap and/or that in the worn state, the central adjustment unit is arranged on the body's longitudinal axis of the wearer. This allows easy and unhindered access to the central adjustment unit and therefore fast and reliable adjustment of the fastening device in the worn state.

In some embodiments, the central adjustment unit is not engaged with or directly in contact with the first and/or second engagement loops, respectively the first and/or second shoulder strap. In some embodiments, the central adjustment unit may only be indirectly be connected with the first and/or second engagement loops via the fastening cord and the corresponding four hook elements.

In some embodiments, the fastening device forms an X-shape between the first and second shoulder strap with the central adjustment unit being arranged in the crossing point, in particular the center, of the X-shape. As mentioned in regard of the first aspect of the invention, in some embodiments, the fastening cord extends from the central adjustment unit directly to each of the four hook elements, through the cord holding receptacle of each of the hook elements and directly from the cord holding receptacle of the corresponding hook element back to the central adjustment unit. Alternatively, in some other embodiments, the fastening cord extends from the central adjustment unit directly to each of the of the four hook elements, then through the cord holding receptacle of each of these hook elements and from the cord holding receptacle of the corresponding hook element directly to another, in particular adjacent, hook element.

In some embodiments, the two distal ends of the cord are freely protruding from the central adjustment unit, that is, they are only directly connected to the central adjustment, but not to other parts of the wearable article.

A third aspect of the invention relates to the use of a fastening device according to any of the embodiments described herein, in particular with respect to the first aspect of the invention. Preferably, the fastening device is used for or in combination with a wearable article, particularly for fastening a wearable article to a wearer.

A fourth aspect of the invention relates to a wearable article, in particular a backpack, a bag or a garment such as a vest, e.g., a running vest. The wearable article according to the fourth aspect of the invention has a first shoulder strap and a therefrom separated second shoulder strap. Each shoulder strap forms a shoulder loop, which in the worn state surrounds the wearer's shoulder and/or arm. The first shoulder strap comprises at least two first engagement loops and the second shoulder strap comprises at least two second engagement loops. The first and/or second engagement loops may particularly be engagement loops as described with respect to any other embodiment described herein, in particular with respect to the second aspect of the invention. The wearable article according to the fourth aspect of the invention further comprises at least two fastening devices. Each fastening device comprises a hook element, in particular only a single hook element, an adjustment unit and a fastening cord, in particular only a single fastening cord, extending between the adjustment unit and the hook element. Each hook element of each fastening device defines a cord holding receptacle, which may in some embodiments be a cord holding groove as described herein. The cord holding receptacle holds the fastening cord of the corresponding fastening device such that the fastening cord can longitudinally be moved through the cord holding receptacle. The adjustment unit of each fastening device further forms a releasable locking connection, in particular a force-locking and/or form-locking and/or frictional-locking connection, with the fastening cord, thereby preventing longitudinally moving the fastening cord through the adjustment unit. Each hook element of each fastening device is further engaged with one of the first or second engagement loops of the first shoulder strap, respectively the second shoulder strap. Furthermore, each adjustment unit is connected, e.g., directly connected, with the other one of the first engagement loop or the second engagement loop of the first shoulder strap, respectively the second shoulder strap. Thus, each hook element and each fastening device is engaged/connected such that each fastening device connects the first and second shoulder strap with each other.

In some embodiments, the first shoulder strap comprises at least 3, particularly at least 4, particularly at least 6, particularly at least 8, first engagement loops and the second shoulder strap comprises at least 3, particularly at least 4, particularly at least 6, particularly at least 8, second engagement loops. In some embodiments, the first shoulder strap comprises 3 to 20, particularly 4 to 15, more particularly at least 6 to 15, more particularly at least 7 to 12, first engagement loops and the second shoulder strap comprises 3 to 20, particularly 4 to 15, more particularly at least 6 to 15, more particularly at least 7 to 12, second engagement loops.

In some embodiments, the adjustment unit may be the same, respectively has the same features, than the central adjustment unit described with respect to the first or second aspect of the invention.

In some embodiments, the adjustment unit of each fastening device is configured such that it is biased into a locking configuration in which it forms the releasable locking connection with the fastening cord. Preferably in the locking configuration, longitudinally moving the fastening cord through the central adjustment unit is essentially avoided.

In certain embodiments, the adjustment unit of each fastening device is configured such that it can be switched between the locking configuration and an open configuration. In the open configuration, longitudinally moving the fastening cord with respect to, in particular through, the adjustment unit is enabled or possible. Preferably, the adjustment unit is configured such that for switching from the locking configuration into the open configuration a biasing force biasing the adjustment unit into the locking configuration must be overcome. The biasing force may for example be 0.5 N to 50 N, in particular 1 N to 25 N.

In some embodiments, the adjustment unit comprises two separate locking channels through which the fastening cord extends. A locking channel is a channel which may for example be switched between a locking configuration, in which longitudinally moving the fastening cord through the adjustment unit and particularly through the locking channel is prevented, to an open configuration in which longitudinally moving the fastening cord with through the adjustment unit, in particular through the locking channel is enabled or possible. Preferably, each locking channel is biased into the locking configuration and may particularly be brought into the open configuration. For example, the adjustment unit may be configured such that in the locking configuration, the locking channel cross-section is narrower than in the open configuration. Particularly, in the locking configuration, the fastening cord may be clamped to the adjustment unit.

In certain embodiments, the adjustment unit may define a tubular housing portion defining a compartment and two pairs of through-going openings which open into the compartment. The two openings of such a pair are typically arranged coaxially to each other. Furthermore, one or more, in particular two, locking structure(s) may be arranged partly or fully inside the compartment. Each locking structure may define a through-going locking structure opening. Each locking structure is arranged such that in the locking configuration, the locking structure opening may be fully or partly offset to at least one pair of through-going openings defined by the tubular housing. In contrast, in the opening configuration, each locking structure may be arranged such that the through-going opening of the locking structure is coaxially arranged with the corresponding pair of through-going openings defined by the tubular housing.

In some embodiments, the adjustment unit of each fastening device forms a releasable connection with the other one of the first or second engagement loops (i.e., these which are not engaged with the hook element) by a form locking connection. In particular, the adjustment unit may at least in one direction be larger than the engagement loop opening, thereby enabling a form locking connection with the corresponding engagement loop.

In some embodiments, each hook element comprises, in addition to the corresponding cord holding receptacle, one or more, in particular two hooks. Such hooks are each being configured for connecting the fastening device with an engagement loop of the wearable article. In particular, such hooks may be configured for engaging with an engagement loop of the wearable article.

In certain embodiments, each hook element is configured such that the one or more hooks are oppositely arranged of the cord holding receptacle.

In some embodiments, each hook defines a groove, which may be considered a hook groove. Particularly such a groove may have a round, e.g., circular or elliptic, cross-section. Preferably each hook defines a constricted groove opening. Typically, the constricted groove opening, respectively the gap between the groove walls is equal or smaller, in particular smaller, than the diameter of the fastening cord. As the hooks are generally at least to a certain extent flexible, the opening can be widened manually for inserting the fastening cord, but thereafter the fastening cord is secured within the groove.

In certain embodiments, each hook may essentially be S-shaped, respectively have the shape of a lower or upper half of an "S".

In some embodiments, each hook element comprises two hooks, particularly only two hooks, which are arranged one after another. Preferably, the two hooks are spaced apart from each other, particularly such that they define a gap between them. This makes the hooks themselves more flexible which simplifies introduction of the fastening cord.

In some embodiments, the two hooks of at least one of the hook elements, or of all of the hook elements, extend in parallel to each other or alternatively inversely to each other.

In some embodiments, the fastening cords of the two fastening elements extend in parallel to each other.

In certain embodiments, each fastening device, respectively each fastening cord of each fastening device, comprises two, in particular only two, fastening cord sections extending in parallel to each other, in particular between the first shoulder strap and the second shoulder strap.

In some embodiments, the fastening cord of each fastening device may be connected to a lug protruding from the fastening cord for fastening the corresponding fastening device.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DESCRIPTION OF PREFERRED EMBODIMENTS

Figure 1:
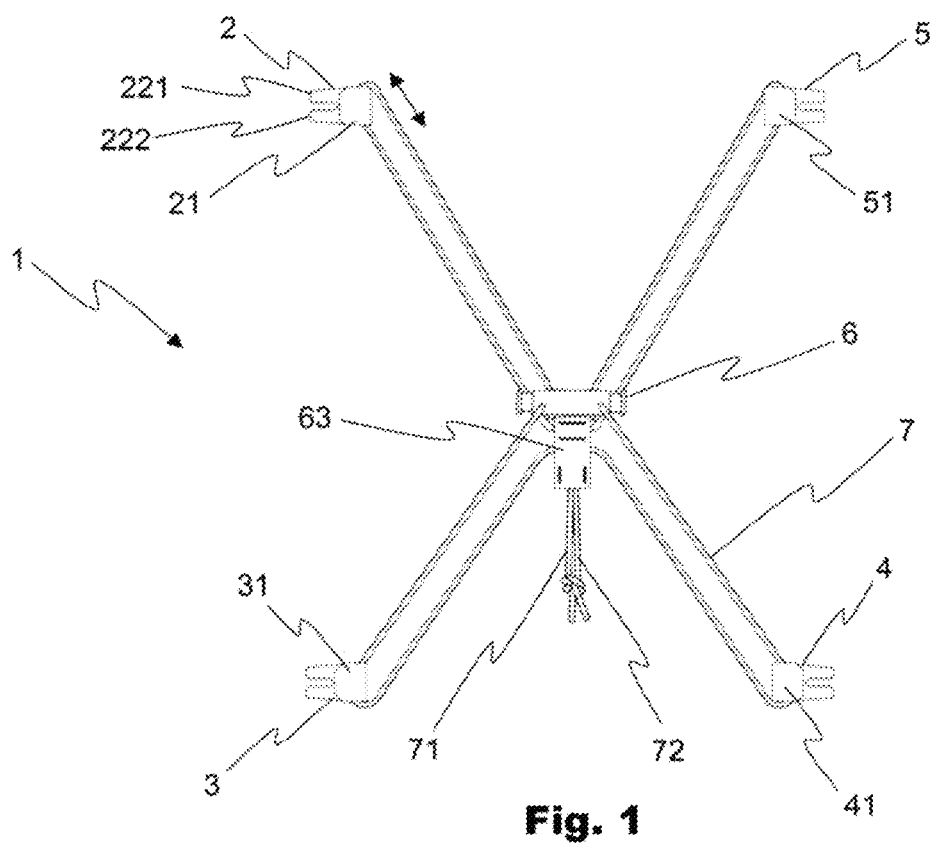
FIG. 1 shows a fastening device according to an embodiment of the invention.

FIG. 1 shows an X-shaped fastening device 1 according to an embodiment of the invention. Fastening device 1 comprises central adjustment unit 6 and four thereto peripherally arranged hook elements 2, 3, 4 and 5, as well as fastening cord 7. Each of the hook elements 2, 3, 4 and 5 defines a cord holding receptacle 21, 31, 41 and 51 (see also FIGS. 6 and 7), which holds the fastening cord such that it can longitudinally be moved through this holding receptacle (i.e., such that the position of the hook element is changed along the fastening cord 7 as indicated by the double arrow). The fastening cord 7 directly connects each hook element 2, 3, 4 and 5 with central adjustment unit 6. For securing a specific configuration, i.e., a relative position of the fastening cord with respect to central adjustment unit 6 and the four hook elements 2, 3, 4 and 5, the central adjustment unit 6 is configured such that it forms a releasable locking connection with fastening cord 7. Central adjustment unit 6 is biased into the locking configuration shown in FIG. 1, i.e., it remains in this position until a biasing force is overcome to bring the central adjustment unit 6 into an open position in which longitudinally moving fastening cord 7 with respect to, particularly through, the central adjustment unit 6 is enabled, respectively possible. In order to mount the fastening device 1 to corresponding engagement loops of a wearable article, each hook element comprises two hooks 221 and 222 (only the hooks of hook element 2 are referenced for clarity purposes). In general, hooks 221 and 222 are facing away from fastening cord 7, respectively cord holding receptacle 21. Hooks 221 and 222 are arranged one after another and are spaced apart from each other, thereby forming a gap between them.

Central adjustment unit 6 further comprises lug 63 through which the fastening cord 7 extends and from which it protrudes with its two distal ends 71 and 72. Distal ends 71 and 72 protrude freely from lug 63, which means that they are unattached on the opposite side from lug 63. Distal ends 71 and 72 are connected by a form-locking connection, e.g., a knot. A wearer can readily bring central adjustment unit 6 into the open configuration by laterally pushing onto the laterally protruding locking structures thereby overcoming a biasing force which may generally for example be exerted by a biasing element such as a spring or an elastic polymer. In this or any other embodiment described herein, the central adjustment unit may be configured such that it can be switched from the locking configuration into the open configuration by a single handed operation, that is, the wearer can bring the central adjustment unit into the open position by using only a single hand. With the other free hand, the wearer can pull distal ends 71 and 72 of fastening cord 7 in order to tighten fastening device 1. Lug 63 defines two different guide channels (see FIG. 2) which are configured such that longitudinally moving the fastening cord 7 through the guide channels is possible, respectively enabled.

In the embodiment shown in FIG. 1, fastening cord 7 extends with two cord sections between each hook element 2, 3, 4 and 5 and central adjustment unit 6. In other words, fastening cord 7 extends from central adjustment unit 6 to each of the hook elements and directly back to the adjustment unit 6. As a representative example, fastening cord 7 extends from central adjustment unit 6 directly to hook element 2, through the corresponding cord holding receptacle 21 and from there directly back to the central adjustment unit 6. The cord sections extending from hook elements 3 and 4 back to central adjustment unit 6 enter a T-shaped guide channel (see FIG. 2 guide channel 631) from opposite sides and then join at the crossing point of the guide channel, are bent at the crossing point and exit the T-shaped guide channel together protruding freely form lug 63.

Figure 2:
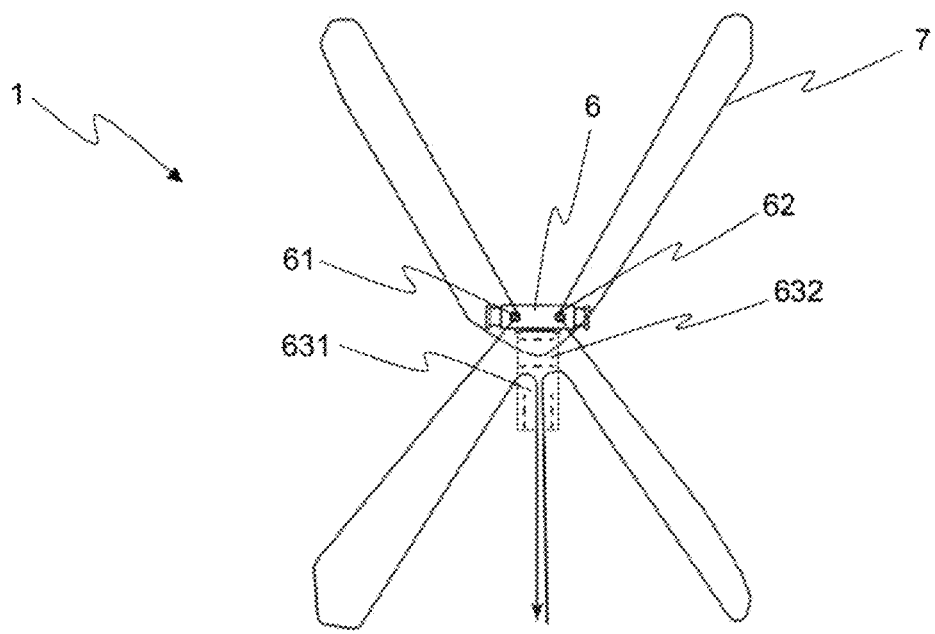
FIG. 2 shows a schematic sectional view of a fastening device according to another embodiment of the invention, wherein the hook elements are not shown for clarity purposes.

FIG. 2 shows a schematic sectional view of a fastening device 1. The hook elements are not shown for clarity purposes. By comparison with FIG. 1 it can be seen that in this or optionally any other embodiment described herein, two sections of the fastening cord extend between central adjustment unit 6 and each of the hook element, wherein one of the two sections extends through a locking channel 61, 62 of the central adjustment unit 6 and the other one of the two sections extends through a guide channel defined by lug 63, either T-shaped guide channel 631 or guide channel 632.

Figure 3:
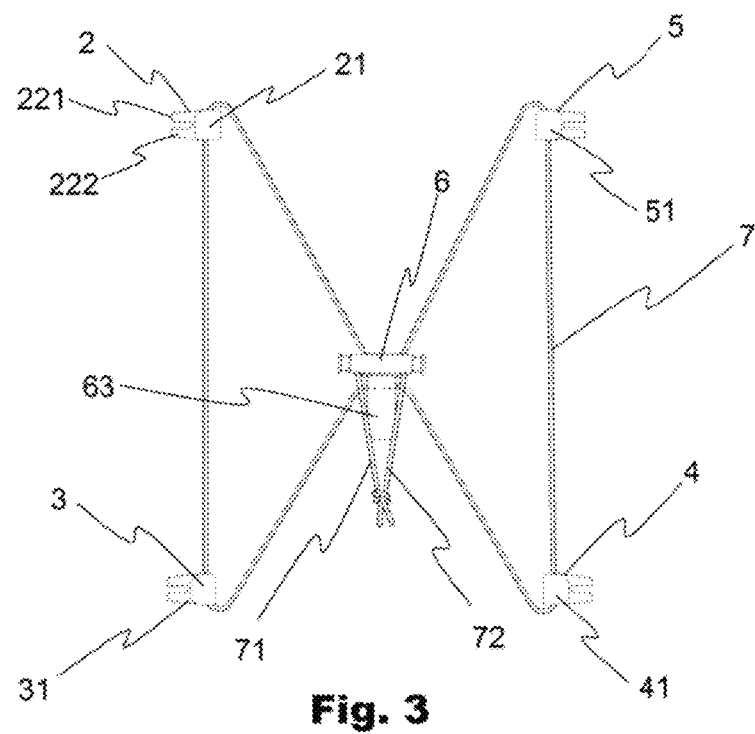
FIG. 3 shows a fastening device according to another embodiment of the invention.

FIG. 3 shows fastening device 1 according to a different embodiment. Particularly, the arrangement of fastening cord 7 is different from the embodiment shown in FIGS. 1 and 2. Fastening cord 7 extends only with a single section directly between central adjustment unit 6 and each one of four hook elements 2, 3, 4 and 5. In addition however, the fastening cord 7 also directly connects two hook elements of a pair of hook elements with each other. In the embodiment shown, hook elements 2 and 3 form a first pair which is directly connected by fastening cord 7 and hook elements 4 and 5 form another, second pair whose hook elements are directly connected by fastening cord 7. In other words, fastening cord 7 extends from central adjustment unit to each one of the four hook elements 2, 3, 4 and 5, through their corresponding cord holding receptacle 21, 31, 41 and 51 and then directly to another one of the hook elements. As an illustrative example, fastening cord 7 extends from central adjustment unit 6, and particularly from a locking channel of the central adjustment unit, to hook element 2, through its cord holding receptacle 21 and from there directly to hook element 3. From hook element 3, the fastening cord then runs through its corresponding cord holding receptacle 31 and from there back to central adjustment unit 6, in particular through a guide channel of central adjustment unit 6 and from there to hook element 4 and 5 before it returns to central adjustment unit 6.

Figure 4:
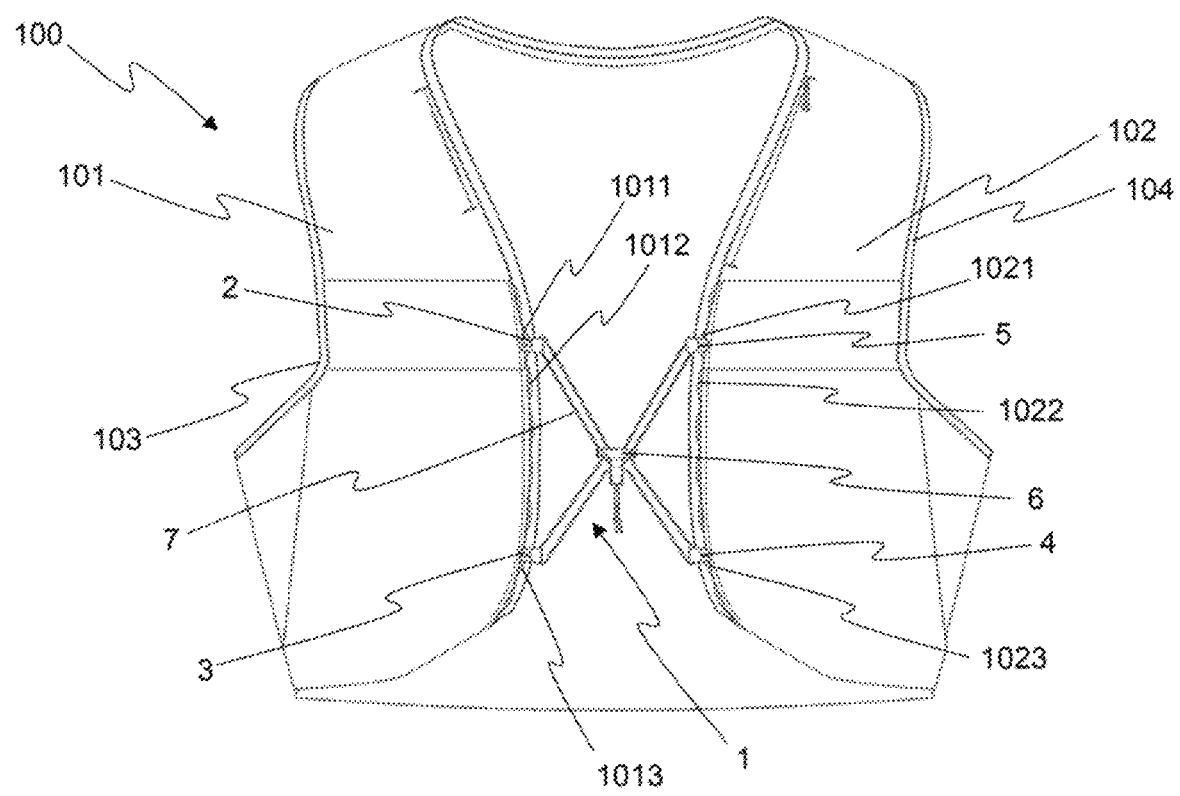
FIG. 4 shows a wearable article according to an embodiment of the invention, particularly of the second aspect of the invention.

FIG. 4 depicts a wearable article 100, such as a vest or a backpack according to an embodiment of the invention, in particular according to the second aspect of the invention. Wearable article 100 comprises first shoulder strap 101 and therefrom separated second shoulder strap 102, wherein each shoulder strap forms a shoulder loop 103, 104 for receiving the wearer's arm and/or shoulder. Wearable article 100 comprises fastening device 1, for example fastening device 1 as shown in the embodiment of FIG. 1. The first shoulder strap 101 comprises eight first engagement loops, such as engagement loops 1011, 1012 and 1013 (only three engagement loops are referenced for clarity purposes). Second shoulder strap 102 comprises also eight engagement loops, such as engagement loops 1021, 1022 and 1023 (only three engagement loops are referenced for clarity purposes). Typically, the first engagement loops and the second engagement loops are aligned with each other, i.e., they are positioned at the same height of their corresponding shoulder strap. Furthermore, in this or any other embodiment described herein, the first engagement loops and the second engagement loops are facing each other.

Two hook elements, namely hook elements 2 and 3, of fastening device 1 are each engaged with a first engagement loop. Hook element 2 is engaged with engagement loop 1011 and hook element 3 is engaged with engagement loop 1013. Furthermore, the remaining two hook elements, namely adjacent hook elements 4 and 5 are each engaged with a second engagement loop. Hook element 4 is engaged with engagement loop 1023 and hook element 5 is engaged with engagement loop 1021. The hook elements are engaged with the corresponding engagement loops such that central adjustment unit 6 is arranged between first shoulder strap 101 and second shoulder strap 102 and further such that the fastening device forms an X-shape between the two shoulder straps 101 and 102.

Figure 5A:
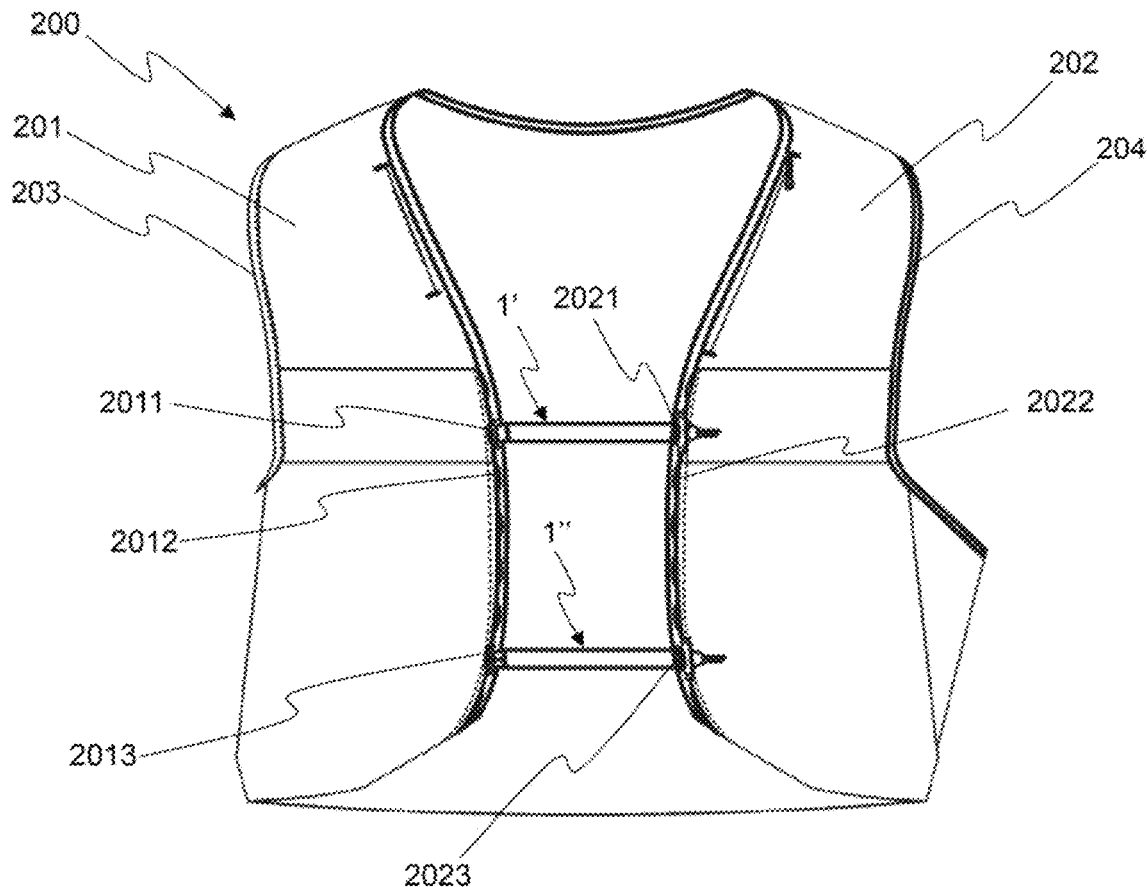
FIG. 5a shows a wearable article according to another embodiment of the invention particularly of the fourth aspect of the invention.
Figure 5B:
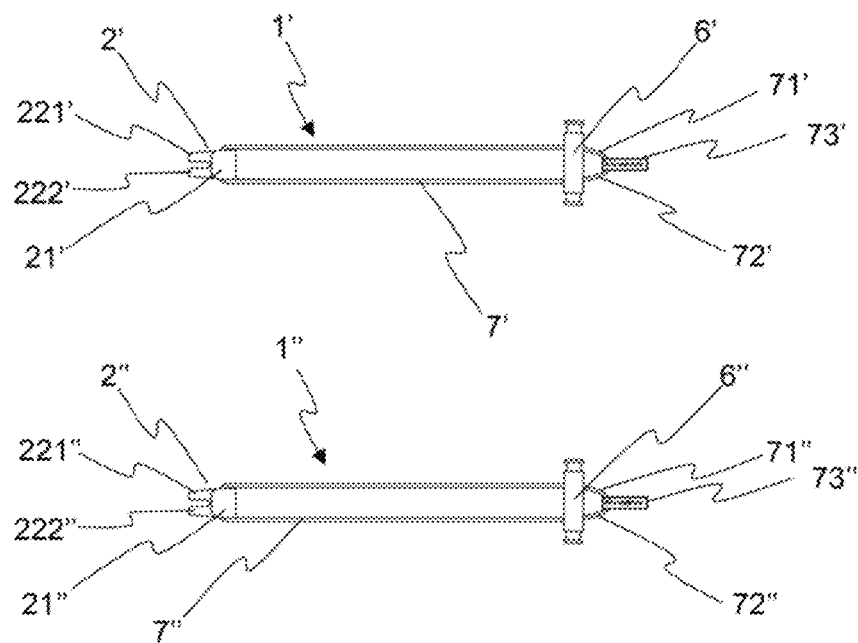
FIG. 5b shows the fastening devices used in the wearable article shown in FIG. 5b.

FIG. 5a shows wearable article 200 according to a different embodiment of the invention, particularly according to an embodiment of the fourth aspect of the invention. FIG. 5b shows a detailed view of the corresponding two fastening devices 1' and 1" used in wearable article 200 of FIG. 5a.

Wearable article 200 comprises first shoulder strap 201 forming shoulder loop 203 and second shoulder strap 202 forming shoulder loop 204. First shoulder strap 201 comprises eight first engagement loops, such as engagement loops 2011, 2012 and 2013 (only three engagement loops are referenced for clarity purposes). Second shoulder strap 202 comprises also eight engagement loops, such as engagement loops 2021, 2022 and 2023 (only three engagement loops are referenced for clarity purposes). The wearable article comprises two fastening devices 1' and 1", which are separate from each other and not directly connected with each other. Each fastening device 1', 1" comprises a single hook element 2', 2" which defines cord holding receptacle 21', 21". The cord holding receptacle holds fastening cord 7', 7" of fastening device 1', 1" such that the fastening cord can longitudinally be moved through the cord holding receptacle. Furthermore, each fastening device 1', 1" comprises adjustment unit 6', 6" forming a releasable locking connection with corresponding fastening cord 7'. 7". The hook element 2', 2" of each of the fastening devices 1', 1" is engaged with one of the first engagement loops of first shoulder strap 201, i.e., hook element 2' is engaged with first engagement loop 2011 and hook element 2" is engaged with first engagement loop 2013. It is clear to the skilled person that it may also be possible to turn around one or both fastening devices 1', 1" by 180°, i.e., such that hook element 2', 2" is connected with one of the second engagement loops 2021, 2022, 2023 of the second shoulder strap 202. Each adjustment unit 6', 6" is connected with a second engagement loop of the second shoulder strap 203. It is clear to the skilled person that if one or both of the fastening devices is turned around by 180° as mentioned above, the corresponding adjustment unit 6', 6" would be connected to a first engagement loop of the first shoulder strap 201. Adjustment units 6', 6" are connected to second engagement loops 2021 and 2023 by a form-locking connection and further such that each fastening device 1', 1" connects first shoulder strap 201 and second shoulder strap 202 with each other. In general, the adjustment unit 6', 6" may be the same as it has been described with respect to any other embodiment, such as the embodiment shown in FIGS. 1 and 2. As can be seen, both fastening devices 1' and 1" comprise a lug 73', 73" being connected to fastening cord 7', 7" and protruding therefrom. In this or any other embodiment described herein, lug 73', 73" may be arranged such that adjustment unit 6', 6" is arranged between corresponding lug 73', 73" and hook element 2', 2". Fastening cord 7', 7" extends from each hook element 2', 2" to adjustment unit 6', 6" and from there back to the hook element 2', 2". Furthermore, each fastening cord 7', 7" fastening device 1', 1" comprises two fastening cord sections extend in parallel to each other between first shoulder strap 201 and second shoulder strap 202.

Figure 6:
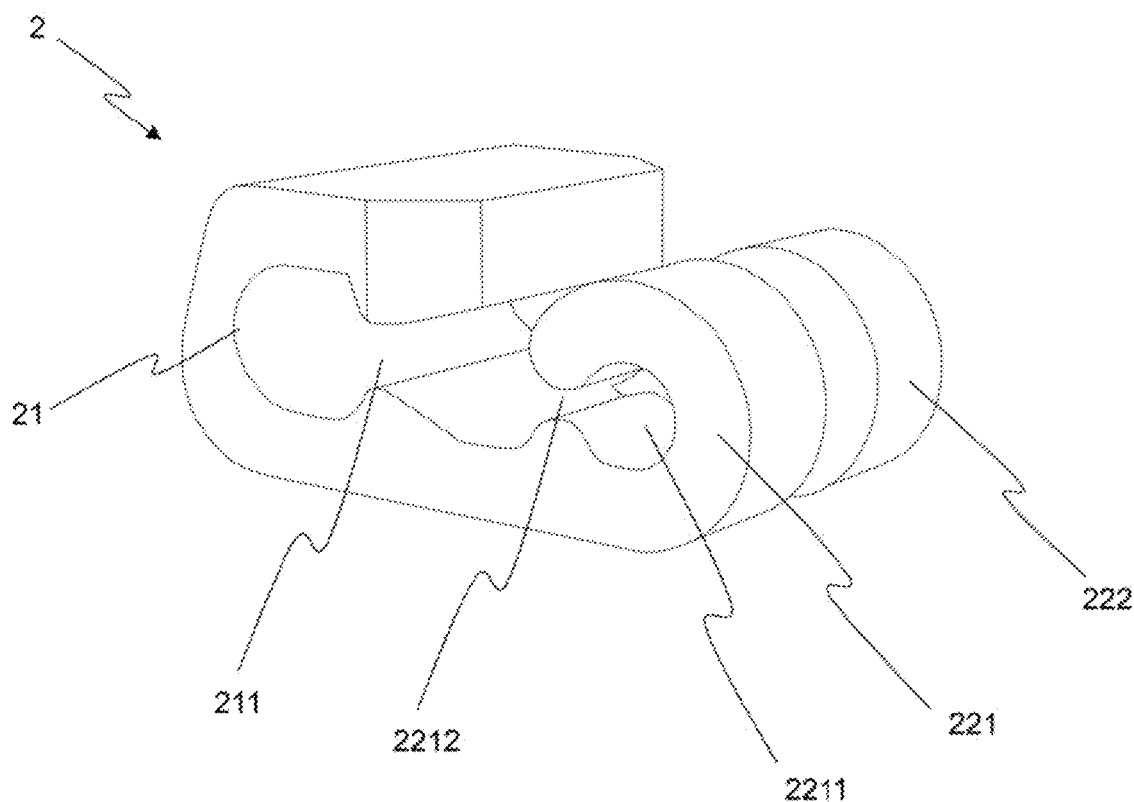
FIG. 6 shows a hook element as it can be used in embodiments of the invention.

FIG. 6 shows a hook element 2 as it can be used in any fastening device described herein. Hook element 2 defines cord holding receptacle 21, which in the embodiment shown is a groove having a constricted opening 211 through which the fastening cord can be inserted but which also secure the fastening cord inside the groove. Furthermore, hook element 2 comprises two hooks 221 and 222 which are arranged one after another. The hooks shown in FIG. 6 extend in parallel to each other, that is they are congruent and can be transformed into each other by linear translation. Each hook, such as hook 221 defines a groove, such as groove 2221 having a round cross-section and having constricted groove opening 2212.

Figure 7:
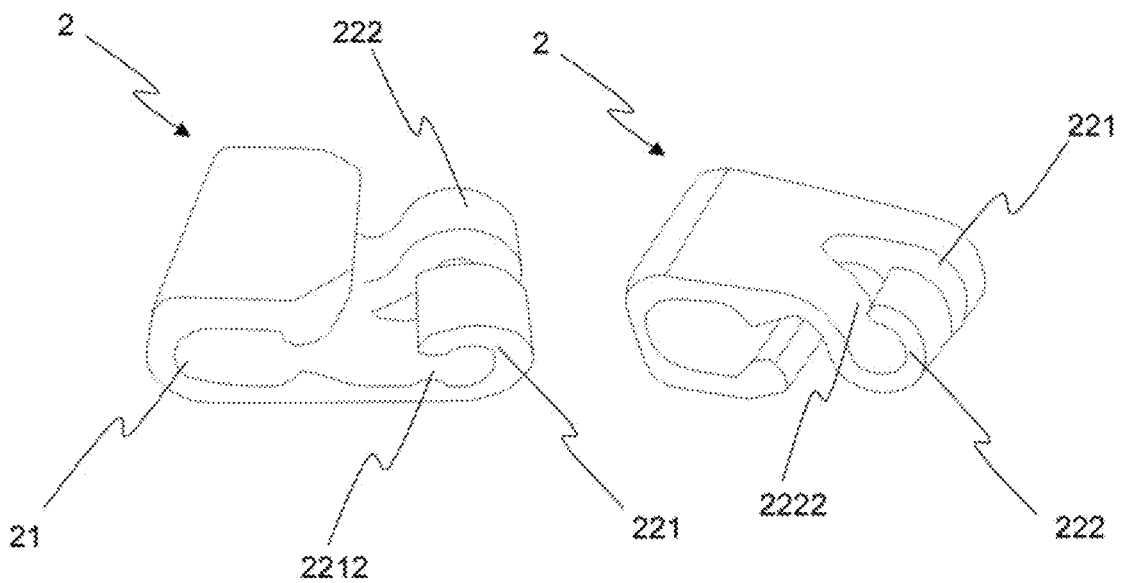
FIG. 7 shows other hook elements as it can be used in other embodiments of the invention.

FIG. 7 shows hook elements 2, which can also be used in any fastening device described herein. Also, these hook elements define cord holding receptacle 21 and a have each two S-shaped hooks 221 and 222 being arranged one after another, but in contrast to the hook element shown in FIG. 6, the two hooks 221 and 222 do not extend in parallel to each other but extend inversely to each other, i.e., they are congruent to each other in that they can be transformed into each other by point inversion. This entails that the corresponding groove openings 2212 and 2222 of the two hooks 221 and 222 are oppositely arranged to each other, which decreases the risk of undesired disconnection of the corresponding fastening device from the first or second engagement loop of a wearable article.

It is claimed:

1. A wearable article (200), in particular a vest, a bag or a backpack, having a first shoulder strap (201) and a second shoulder strap (202) each forming a shoulder loop (203, 204) of the wearable article (200), wherein the first shoulder strap (201) comprises at least two first engagement loops (2011, 2012, 2013) and wherein the second shoulder strap (202) comprises at least two second engagement loops (2021, 2022, 2023); the wearable article (200) comprising at least two fastening devices (1', 1"), wherein each fastening device (1', 1") comprises: a hook element (2', 2"), an adjustment unit (6', 6") and a fastening cord (7', 7") extending between the adjustment unit (6', 6") and the hook element (2', 2"); wherein each hook element (2', 2") defines a cord holding receptacle (21', 21") which holds the fastening cord (7', 7") such that the fastening cord (7', 7") can longitudinally be moved through the cord holding receptacle (21', 21"), wherein the adjustment unit (6', 6") forms a releasable locking connection, in particular a force-locking and/or form-locking and/or frictional connection, with the fastening cord (7', 7"); and wherein each hook element (2', 2") of each fastening device (1', 1") is engaged with one of the first (2011, 2013) or second engagement loops of the first (201) or second shoulder strap and each adjustment unit (6', 6") is connected with one of the first or second engagement loops (2021, 2023) of the other one of the first or second shoulder strap (202) such that each fastening device (1', 1") connects the first (201) and second shoulder strap (202) with each other.

2. The wearable article (200) according to claim 1, wherein the adjustment unit (6', 6") of each fastening device (1', 1") is configured such that it is biased into a locking configuration in which it forms the releasable locking connection with the fastening cord (7', 7"), wherein in the locking configuration, longitudinally moving the fastening cord (7', 7") through the adjustment unit (6', 6") is essentially avoided.

3. The wearable article (200) according to claim 2, wherein the adjustment unit (6', 6") of each fastening device (1', 1") is configured such that it can be brought from the locking configuration into an open configuration, wherein longitudinally moving the fastening cord (7', 7") through the adjustment unit (6', 6") is possible in the open configuration.

4. The wearable article (200) according to claim 1, wherein the adjustment unit (6', 6") of each fastening device (1', 1") comprises two separate locking channels through which the fastening cord (7', 7") extends, wherein each locking channel is biased into the locking configuration and can be brought into the open configuration.

5. The wearable article (200) according to claim 1, wherein the two distal ends (71', 72', 71", 72") of the fastening cord (7', 7") protrude from the adjustment unit (6', 6"), wherein preferably the two distal ends (71', 72', 71", 72") are connected together, in particular by a form-locking, force locking and/or material bonded connection.

6. The wearable article (200) according to claim 1, wherein each hook element (2', 2") comprises one or two hooks (221', 222', 221", 222") configured for connecting the fastening device (1', 1") with an engagement loop (2011, 2013) of the wearable article (200).

7. The wearable article (200) according to any of claim 1, wherein the fastening cords (7', 7") of the two fastening elements (1', 1") extend in parallel to each other.

8. The wearable article according to claim 1, wherein for each fastening device, the engagement loop with which the adjustment unit is connected is arranged between the adjustment unit and the hook element of the fastening device.

\* \* \* \* \*